Figure 1:
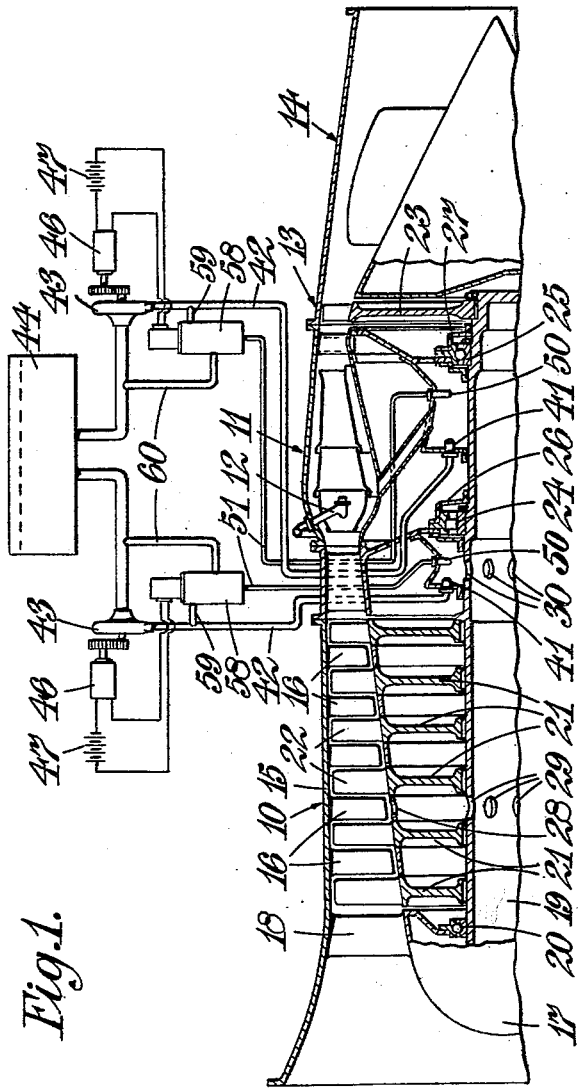

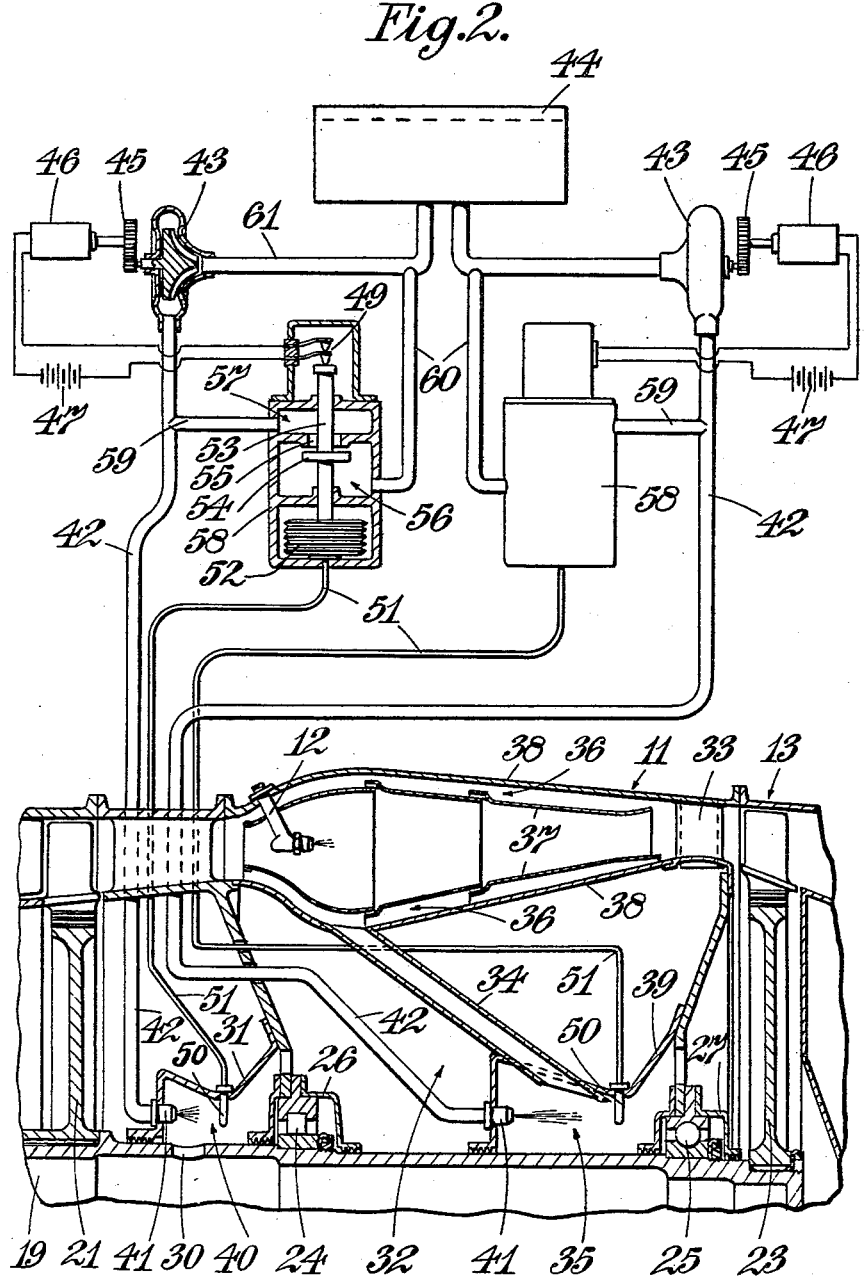

April 2, 1963

H. COOK 3,083,532

GAS TURBINE ENGINE WITH AIR-COOLING MEANS
AND MEANS TO CONTROL THE TEMPERATURE OF
COOLING AIR BY LIQUID INJECTION

Filed Aug. 23, 1954

3 Sheets-Sheet 3

INVENTOR

H. Cook

By Wilkinson & Mawhinney

ATTYS.

United States Patent Office 3,083,532
Patented Apr. 2, 1963

3,083,532
GAS TURBINE ENGINE WITH AIR-COOLING MEANS AND MEANS TO CONTROL THE TEMPERATURE OF COOLING AIR BY LIQUID INJECTION
Henry Cook, Darley Abbey, Derby, England, assignor to Rolls-Royce Limited, Derby, England, a British company
Filed Aug. 23, 1954, Ser. No. 451,325
Claims priority, application Great Britain Sept. 7, 1953
9 Claims. (Cl. 60—39.66)

This invention relates to gas-turbine engines, and is more particularly, but not exclusively, concerned with such engines suitable for installation in aircraft designed to fly at speeds in excess of the speed of sound.

In gas-turbine engines and in aircraft comprising a gas-turbine engine installation, it is common practice to use air abstracted from atmosphere for the purpose of cooling parts of the engine, more particularly bearings and associated structure, and engine auxiliaries such as high-pressure air compressors and lubricating oil coolers. Such air may be compressed in a compressor system of the engine, or may in certain cases be ducted from atmosphere directly to an auxiliary of the engine such as a high-pressure air compressor or a lubricating oil cooler.

Where an aircraft is flying at high speed, for example at speeds considerably in excess of the speed of sound, there is a substantial rise in the temperature of the air entering the engine installation, and if the air is further compressed by the compressor system of the engine there is an additional temperature rise; it is thus possible for the temperature of the air to become too high for the air to be effective for cooling purposes. Even where no subsequent compression of the air takes place in the engine compressor, the temperature rise due to forward flight speed may be so large that the air has a temperature too high for efficient cooling to be effected.

According to the present invention, there is provided in a gas-turbine engine or in a gas-turbine engine installation means for introducing a liquid into a cooling air flow, when the air temperature is in excess of the temperature at which said liquid will vaporize at the pressure of said cooling air flow, whereby the cooling air flow is cooled in vaporizing the liquid. Additional cooling of the cooling air will be effected in heating the liquid to vaporizing temperature and in heating the vapor. Preferably water is used as the cooling liquid and control means is provided to inject the cooling liquid into the cooling air when the air temperature is in excess of that at which water vaporizes at the pressure existing within the cooling air flow.

Some embodiments according to this invention will now be described with reference to the accompanying drawings in which:

FIGURE 1 illustrates a gas-turbine engine with parts broken away to show the internal structure thereof, the engine being fitted with cooling air supply means in accordance with the invention, FIGURE 2 illustrates the cooling system of FIGURE 1 to a larger scale, and FIGURE 3 illustrates a gas-turbine engine fitted with a second form of cooling system in accordance with this invention.

Referring to FIGURES 1 and 2, the gas-turbine engine is suitable for use to power an aircraft in flight above the speed of sound and comprises a compressor 10 in which air is taken in from atmosphere and compressed, combustion equipment 11 to which the compressed air is delivered to be burnt with fuel supplied through fuel injectors 12, a turbine 13 which is connected to receive hot gases from the combustion equipment 11, and an exhaust assembly 14 through which exhaust gases from the turbine flow to atmosphere.

The compressor 10 comprises a stator casing 15 carrying a number of rows of stator blades 16 and also carrying a bullet-like bearing housing 17 centrally within a flared portion at its intake end, the housing 17 being connected to the stator casing 15 by means of a number of struts 18. The compressor 10 also comprises a rotor having a hollow central shaft 19 whereof the front end is mounted in a bearing 20 accommodated in the bearing housing 17, and a series of blade-carrying discs 21 each of which has at its periphery a row of rotor blades 22. The shaft 19 extends rearwardly from the compressor centrally through the combustion equipment 11 and has mounted on its rear end the rotor 23 of the turbine 13 so that the turbine drives the compressor. The rear part of the shaft 19 is supported in a pair of axially-spaced bearings 24, 25, whereof the bearing 24 is adjacent the outlet end of the compressor 10 and the bearing 25 is adjacent the turbine disc 23.

It will be appreciated that in operation of the engine it will be necessary to cool the bearings 24 and 25 because they are located adjacecnt hot structure, and for this purpose cooling air is caused to flow over the housings 26 and 27 for the bearings 24 and 25, the air for cooling the bearing 24 being tapped off from an intermediate stage of the compressor and the air for cooling the bearing 25 being tapped off from the combustion equipment 11.

The tapping means for the cooling air for the bearing 24 comprises ports 28 formed in the periphery of the compressor rotor so that air flows into the space between a pair of the discs 21, ports 29 formed in the shaft 19 to permit the air to flow from this space into the hollow compressor shaft 19, and ports 30 also formed in the shaft 19 to allow the air so tapped off from the compressor 10 to flow out from the compressor shaft 19 into a chamber 40 forming part of stator structure just upstream of the bearing 24. The air in flowing through the chamber 40 is guided by a fixed wall 31 to pass over the bearing housing 26, and the air after flowing over the bearing housing 26 passes into a space 32 provided between the shaft 19 and the combustion equipment 11 and flows from this space to atmosphere through hollow guide vanes 33 of the turbine 13.

The cooling air for the bearing 25 is tapped off from the combustion equipment 11 by means of one or more conduits 34 which lead into a space 35 around the bearing housing 27 from the air space 36 provided in the combustion equipment 11 between a flame tube 37 wherein combustion occurs and the main air casing 38 which encloses the flame tube 37 and has its walls spaced from the walls of the flame tube. Part of the air entering the combustion equipment 11 flows directly into the flame tube 37 and the remainder flows in the spaces 36 outside the flame tube. The air entering the space 35 is caused to flow over the bearing housing 27 by means of the wall 39 bounding the space 35 and, after flowing over the housing 27, the cooling air flows outwardly over the upstream surface of the turbine disc 23 back into the working fluid annulus of the turbine 13.

In certain circumstances, the temperature of the cooling air is too high for satisfactory cooling of the bearings 24 and 25 to be effected. Such a condition may exist, for instance, when the aircraft in which the engine is fitted, is flying at a high speed, so that the air entering the compressor 10 is compressed in the air intake to the compressor by the ram effect and is thus heated.

The present invention provides means whereby the temperature of the cooling air may be kept at a desirable value.

Referring more specifically to FIGURE 2, there is illustrated one suitable arrangement of the means. Each of the chambers 40 and 35 has fitted in a wall thereof a liquid atomizing nozzle 41 and these nozzles are supplied with a liquid, for instance water, through supply pipes 42 the upstream ends of which are connected to individual liquid pumps 43, which are illustrated for convenience as centrifugal pumps, and which draw the cooling liquid from a supply tank 44.

It will be clear that when the liquid is delivered as a spray into the chambers 40 and 35, the air flowing in these chambers is cooled due to the evaporation of the liquid.

In the embodiment illustrated, the flow of liquid to the nozzles 41 is controlled to be initiated when the temperature of the cooling air tends to rise above a selected value, and thereafter to be increased as the temperature of the air tends to increase. One suitable form of control for this purpose is illustrated, each pump having an associated control.

In each case, the pump 43 is driven through gearing 45 by an electric motor 46 supplied with current from, say, a battery 47 and the motor circuit contains a switch 49 arranged for actuation by a temperature-sensitive device. The temperature-sensitive device comprises, for instance, a bulb 50 arranged in the corresponding chamber 40 or 35 in the path of the cooling air flow and downstream of the corresponding liquid injection nozzle 41. The bulb is connected by a capillary tube 51 to an expansible bellows capsule 52, and the bulb 50, capillary tube 51 and capsule 52 are filled with a liquid such as paraffin. As the temperature of the air flowing over the bulb 50 increases so the liquid therein expands causing the bellows 52 to expand. When the temperature sensed by the bulb 50 reaches a selected value, a rod 53 which is carried by the capsule 52 closes the switch 49 so starting the motor 46 to drive the pump 43. The rod also carries a valve element 54 which co-operates with a port 55 formed in a wall between a pair of chambers 56 and 57 provided in a housing 58, and it is arranged that the valve element 54 approaches its seat around the port 55 more closely as the temperature sensed by the bulb 50 increases. The chamber 57 is connected by a pipe 59 to the liquid supply pipe 42 and the chamber 56 is connected by a pipe 60 to the suction pipe 61 of the associated pump 43. Thus when the valve element 54 is off its seat a proportion of the liquid delivered by the pump 43 is recirculated through the pump and the proportion of the liquid recirculated decreases as the temperature sensed by the bulb 50 increases.

The separate supply and control arrangements for supplying the cooling liquid to the two chambers 40 and 35 are employed for reasons of economy in the use of the coolant liquid, but if desired a single control system may be employed.

Referring now to FIGURE 3, there is illustrated an application of the invention to the cooling system for lubricating oil circulated in the lubricating system of a gas-turbine engine 62.

The lubricating system is illustrated as comprising a storage tank 63 from which lubricant is drawn through a pipe 64 by a pump 65 which delivers the oil through a pipe 66 into an oil cooler. The oil cooler comprises a serpentine pipe 67 accommodated within an air duct 68 having a forwardly-facing air intake 68a and a rearwardly-facing outlet end, so that when the aircraft in which the engine 62 is fitted is in flight, there is a flow of cooling air over the serpentine pipe 67 to cool the oil flowing therethrough. The oil flows from the serpentine pipe 67 into a number of distributor branches 69, each of which leads to an associated bearing. For instance, one distributor branch 69 leads to a housing 70 for the front bearing 71.

The oil system also includes an oil scavenge system including individual collector branches 72 leading from the respective bearing housings such as the housing 70 to the inlet side of a scavenge pump 73, from which the scavenged oil is delivered through a pipe 74 back to the oil tank 63. Both the pumps 65 and 73 are indicated as being engine-driven pumps, the drives therefor being indicated at 75.

In the event that the temperature of the air flowing over the serpentine pipe 67 becomes too high due to ram effects, a liquid such as water, is sprayed into the air stream flowing in the duct 68 at a point upstream of the serpentine pipe 67, thus to cool the air by evaporation of the liquid. The cooling liquid is sprayed into the duct 68 by an atomizing nozzle 76 which is fed with liquid by a supply system similar to that described for the nozzles 41 and having a temperature-sensitive control as above described.

In the above arrangements, the cooling air may also be employed for cooling other parts of the engine or its installation. For instance, in the construction of FIGURES 1 and 2, the cooling air may be employed to cool turbine structure, such as the rotor blades.

Also, instead of being motor driven, the pumps 43 may be engine driven.

While the invention has been described as being more particularly applicable for use in aircraft gas-turbine installations, it will be appreciated that in certain cases the use of high compression ratio compressor systems in a gas-turbine engine, e.g. one designed for marine propulsion, may necessitate cooling air flows at high pressures, and where such air is abstracted from the compressor system the temperature rise due to such compression may make it desirable to cool the air before it is used for cooling purposes. Thus the invention is applicable to such gas-turbine engines, the water or other suitable liquid being introduced into the cooling air to be vaporized therein before the air is used for cooling purposes.

I claim:
1. A gas turbine power plant comprising air intake means, a compressor, combustion equipment, said combustion equipment including fuel injection means, a turbine, said turbine including a turbine rotor disc, and exhaust ducting in flow series to form a working fluid flow path for air entering the air intake means, means conveying a minor proportion of the air from said flow path at a point upstream of fuel injection and directing said air to flow over the face of said turbine rotor disc to cool it, means for injecting a cooling liquid into said flow, means to control said injection, and means sensitive to the temperature of said air flow and adapted to operate said control means to initiate said injection when said temperature reaches a selected value which is above the temperature at which said liquid will vaporize.

2. A gas tubine engine as claimed in claim 1 in which said means sensitive to the temperature of said cooling air is further adapted to operate said control means to increase the rate of injection of said liquid as the temperature of the cooling air tends to increase above said selected value and which comprises a temperature bulb located in the cooling air flow downstream of the location in said flow at which cooling liquid injection occurs, and an expansible capsule, capillary tubing connecting said bulb and said capsule, a liquid which expands on increase of temperature filling said bulb, said capsule and said capillary tubing, said means to control said injection being adapted to be operated by said capsule, and said means for injecting said cooling liquid comprises a pump, driving means connected to drive the pump, inlet ducting to said pump, and outlet ducting from said pump to the location at which cooling liquid is to be injected, and said means to control said injection comprises means operated by said capsule to initiate operation of said pump driving means.

3. A gas turbine engine as claimed in claim 2 in which said means to control said injection further comprises a by-pass duct connecting said outlet ducting with said inlet ducting, a valve in said by-pass duct to control the flow therethrough, the degree of opening of said valve being controlled by the expansion of said capsule in the sense to close said valve with said expansion.

4. A gas turbine engine as claimed in claim 3 in which the pump driving means is an electric motor and switch contacts controlling the supply of operating current to said motor, said switch contacts being adapted to be closed by expansion of said capsule.

5. A gas turbine power plant comprising air intake means, a compressor, combustion equipment, said combustion equipment including fuel injection means, a turbine, and exhaust ducting in flow series to form a working fluid flow path for air entering said air intake means, a rotor shaft connecting said compressor to said turbine, bearing means supporting said shaft, means conveying a minor proportion of the air from said flow path at a point upstream of fuel injection and directing said air to flow over said bearing means to cool it, means for injecting a cooling liquid into said air flow, means to control said injection, and means sensitive to the temperature of said air flow and adapted to operate said control means to initiate said injection when said temperature reaches a selected value which is above the temperature at which said liquid will vaporize.

6. A gas turbine engine as claimed in claim 5 in which said means sensitive to the temperature of said cooling air flow is further adapted to operate said control means to increase the rate of injection of said liquid as the temperature of the cooling air tends to increase above said selected value, a temperature bulb located in the cooling air flow downstream of the location in said flow at which cooling liquid injection occurs, an expansible capsule, capillary tubing connecting said bulb with said capsule, a liquid which expands on increase of temperature filling said bulb, said capsule and said capillary tubing, said means to control said injection being adapted to be operated by said capsule comprising a pump, driving means connected to drive the pump, inlet ducting to said pump, and outlet ducting from said pump to the location at which cooling liquid is to be injected, and in which the means to control said injection comprises means operated by said capsule to initiate operation of said pump driving means.

7. A gas turbine engine as claimed in claim 6 in which said means to control said injection further comprises a by-pass duct connecting said outlet ducting with said inlet ducting, a valve in said by-pass duct to control the flow therethrough, the degree of opening of said valve being controlled by the expansion of said capsule in the sense to close said valve with said expansion.

8. A gas turbine engine as claimed in claim 7 in which the pump driving means is an electric motor and switch contacts controlling the supply of operating current to said motor, said switch contacts being adapted to be closed by expansion of said capsule.

9. A gas turbine power plant comprising air intake means, a compressor, combustion equipment, said combustion equipment including fuel injection means, a turbine and exhaust ducting in flow series to form a working fluid flow path for air entering the air intake means; said power plant further comprising hot structure outside of the combustion zone, means conveying a minor proportion of the air from said flow path at a point upstream of fuel injection and directing said air to flow over said hot power plant structure to cool it; means for injecting a cooling liquid into said flow at a point upstream of the hot structure which comprises a pump, driving means connected to drive the pump, inlet ducting to said pump and outlet ducting from said pump to the location at which cooling liquid is to be injected; means to control said injection, means sensitive to the temperature of said air flow operating said control means to initiate said injection only when said air flow temperature reaches a selected value which is above the temperature at which said liquid will vaporize therein, said temperature-sensitive means being exposed to the cooling air flow downstream of the location in said flow at which cooling liquid injection occurs, and said means to control said injection comprising means operated by said means sensitive to the temperature of said air flow to initiate operation of said pump driving means.

References Cited in the file of this patent

UNITED STATES PATENTS

| | | |
|---|---|---|
| 820,549 | Caldwell | May 15, 1906 |
| 1,284,334 | Hodge | Nov. 12, 1918 |
| 1,917,006 | Anderson | July 4, 1933 |
| 2,123,742 | Offen | July 12, 1938 |
| 2,438,998 | Halford | Apr. 6, 1948 |
| 2,469,678 | Wyman | May 10, 1949 |
| 2,477,931 | King | Aug. 2, 1949 |
| 2,584,899 | McLeod | Feb. 5, 1952 |
| 2,639,579 | Willgoos | May 26, 1953 |
| 2,647,368 | Triebbnigg et al. | Aug. 4, 1953 |
| 2,669,091 | Schutte | Feb. 16, 1954 |
| 2,791,090 | Hooker | May 7, 1957 |

FOREIGN PATENTS

| | | |
|---|---|---|
| 276,864 | Germany | July 21, 1914 |